UNITED STATES PATENT OFFICE.

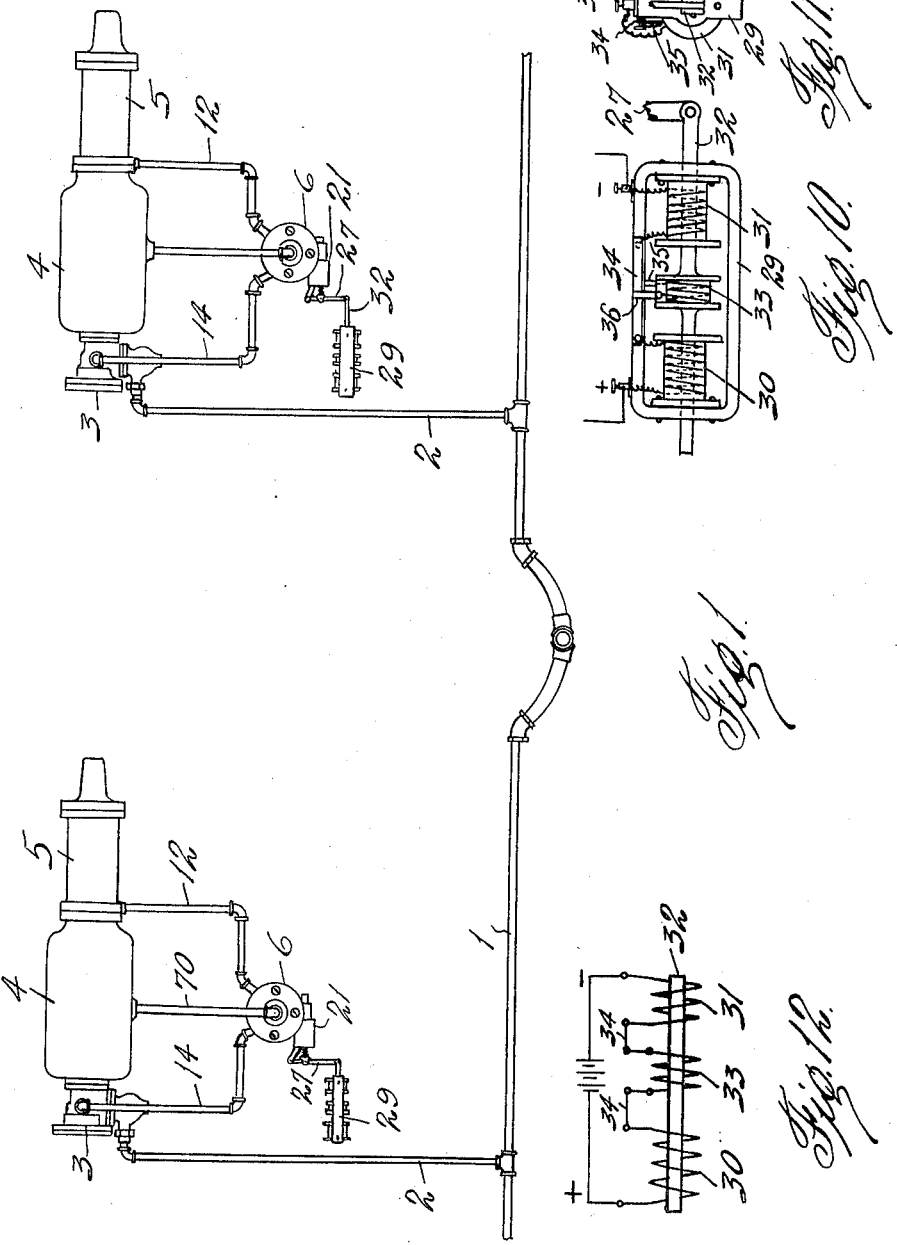

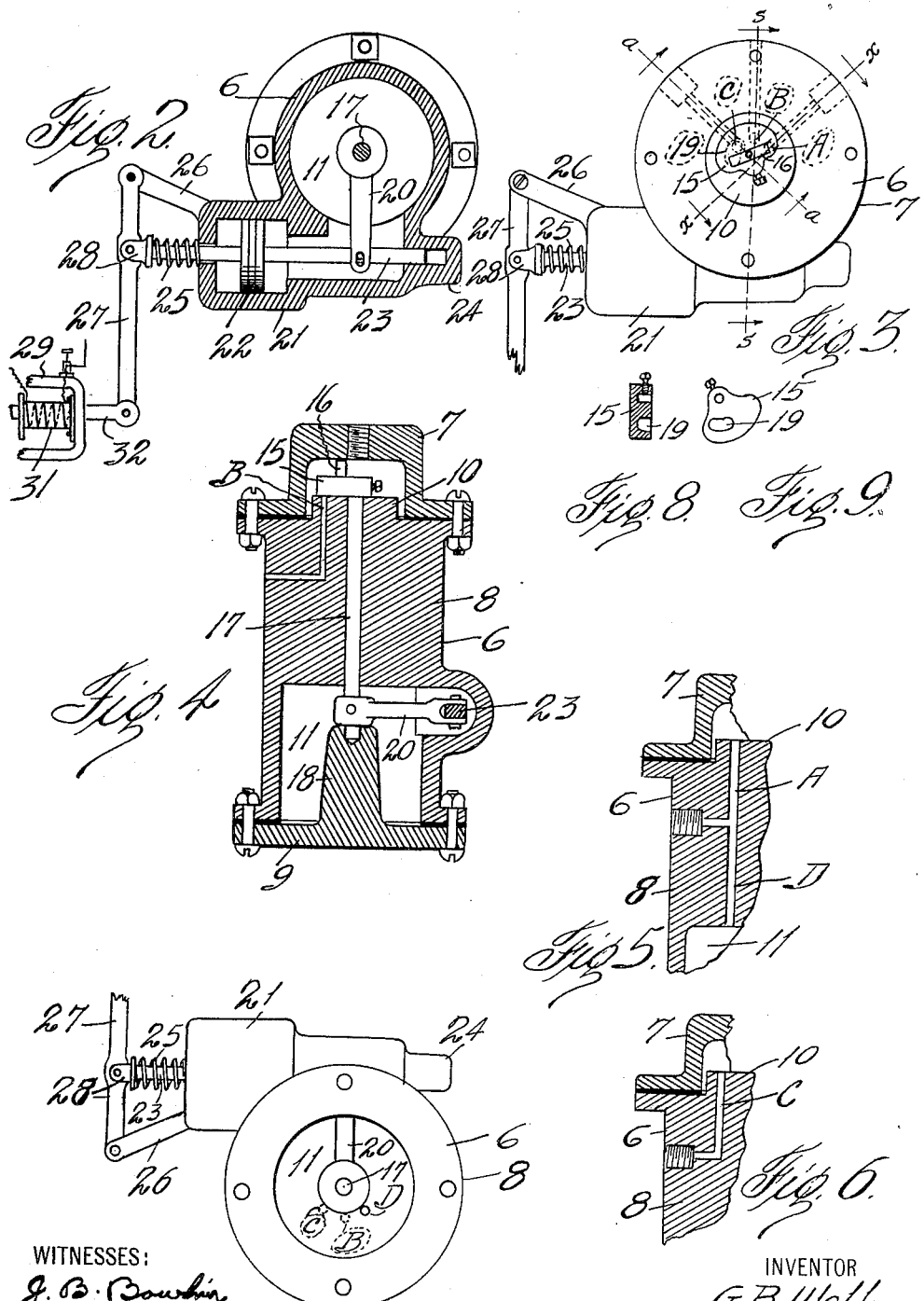

GUSTAV B. WOLF, OF SMITHVILLE, TEXAS.

AIR-BRAKE.

1,083,971.  Specification of Letters Patent.  Patented Jan. 13, 1914.

Application filed May 25, 1911. Serial No. 629,264.

*To all whom it may concern:*

Be it known that I, GUSTAV B. WOLF, citizen of the United States, residing at Smithville, in the county of Bastrop and State of Texas, have invented certain new and useful Improvements in Air-Brakes, of which the following is a specification.

This invention relates to improvements in air brakes.

It is a well known fact that on trains made up of many cars when a reduction is made in the brake pipe pressure the brakes on the cars nearest the engine will set quicker and before the brakes on the cars at the rear of the train. The brakes on the front cars will also release quicker than those on the rear cars. In particularly long trains this causes a jolt which is detrimental to the cars and their equipment. In the brake equipment now in common use there is no means controllable from the engine whereby the brakes can be simultaneously set on each and every car and under the same pressure irrespective of the travel of brake cylinder piston.

It is the object of this invention to provide means whereby the brakes on all cars may be simultaneously set and under substantially the same auxiliary pressure irrespective of the travel of the brake cylinder piston.

A further object is the provision whereby a certain pressure of air may be retained in the brake cylinder thereby obviating the use of pressure retaining valves which are mounted on the cars and connected with the release port of the triple valve.

Another object is to provide a controlling device which will act instantaneously in conjunction with a pressure equalizing device and whereby the pressure of the air retained in the brake cylinder may be varied.

A still further object of the invention is to provide an apparatus that will be strong, durable, efficient, and comparatively inexpensive and simple to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a diagrammatical view showing the parts of the air brake in their relative position also showing their relation to the air brake equipment now in common use, Fig. 2 is a transverse sectional view of the valve mechanism, Fig. 3 is a plan view of the same with the cap removed, Fig. 4 is a vertical section of the same taken on the line *s—s* of Fig. 3, Fig. 5 is a detail in vertical section taken on the line *x—x* of Fig. 3, Fig. 6 is a detail in vertical section taken on the lines *a—a* of Fig. 3, Fig. 7 is an underside view of the valve mechanism, Fig. 8 is a detail in section of the valve, Fig. 9 is an underside view of the valve, Fig. 10 is a plan view of the electrical controlling device, Fig. 11 is an end elevation of the same, and Fig. 12 is a circuit diagram.

In the drawings the numeral 1 designates the train pipe, 2 the branch pipe leading to the triple valve 3 mounted on the auxiliary reservoir 4, which is connected to the brake cylinder 5, all of which are now in common use and form part of what is known as a "standard equipment." From this it will be apparent that in employing this invention no part of the usual brake apparatus is omitted, but as will be hereinafter set forth certain parts may be omitted, thus making it possible to use the invention in connection with the present apparatus without altering the same, or employing it with certain parts of the present equipment omitted.

A valve casing 6 is located adjacent the auxiliary reservoir and has a pipe 70 leading from the center of its top to the said reservoir whereby air at auxiliary pressure is constantly admitted to the valve casing. The casing comprises a cap 7, a body 8 and a bottom plate 9, the parts being flanged and bolted together with suitable gaskets interposed. The pipe 70 is connected to the cap which forms an air chamber over the body 8. On the body a boss 10 is formed so as to project into the cap. In the lower portion of the body a cavity or chamber 11 is provided and sealed by the bottom plate 9.

Three passages lead through the boss. These passages are designated by the letters A, B and C. The passages extend through the body and have a right angular shape so as to open through the side of the body as shown in Figs. 4, 5 and 6. The passage A has a branch D leading to the cavity 11. From the lateral portion of the passage A a pipe 12 leads to the brake cylinder 5 so as to communicate with the same at its extreme inner end. The passage B is a release or exhaust passage and opens to the atmosphere. The passage C has its lateral portion connected with a pipe 14 leading to the release or exhaust port of the triple valve 3.

The passages are in concentric relation to the center of the boss 10 and reasonably close together so as to be covered by a valve 15. The upper surface of the boss and the under surface of the valve are ground so that the parts may engage closely to prevent the passage of air therebetween. It is apparent that auxiliary air being constantly admitted to the cap 7, the valve will be subjected to the pressure of the same and held down upon the boss. However as an assistant to this auxiliary pressure a flat spring 16 having upwardly curved ends is secured on the valve and bears against the underside of the cap.

The valve is recessed to receive the upper end of a valve stem 17 and suitably fastened thereon. This valve stem extends vertically through the body 8 and projects into the cavity 11, having its lower end bearing in a boss 18 projecting upward from the center of the bottom plate 9. The valve is of such size as to cover the three passages, but when moved slightly to uncover the passage A. In the underside of the valve a duct 19 is disposed so as to establish communication between the passages B and C when the passage A is closed by the valve and to stand only over the passage C when the passage A is uncovered.

It will be apparent that when the valve stem is moved to swing the valve and uncover the passage A auxiliary air from the pipe 70 will flow into said passage and by way of the pipe 12 to the brake cylinder 5 and thus operate the brake piston in the usual way. Some of this auxiliary air will also flow through the branch passage D into the cavity 11, for a purpose which will be described later. When the valve is in this position, a lever 20 extending horizontally from the valve stem 17 in the cavity, will be swung to the right and at the end of its stroke with relation to Fig. 2, the valve having been swung to the left during the movement of the lever. When it is desired to keep the brakes applied, the lever 20 is swung to a central position which swings the valve 15 so as to close all passages in the boss 10, which is known as lap position. Now should it be desired to release the brakes the lever 20 is swung to the left with relation to Fig. 2, thus swinging the valve to the right which closes the passage A and brings the duct 19 into position to connect the passages B and C. With the parts in this position the exhaust air from the brake cylinder passes in the usual way to the triple valve 3 and through the release port thereof into the pipe 14. The air flowing into the pipe 14 will be conveyed to the passage C and from there to the atmosphere by way of the duct 19 and passage B.

On the valve casing 6 a small horizontal cylinder 21 is provided. A piston head 22 is mounted in this cylinder on a piston rod 23 which extends through the ends of the cylinder as shown in Fig. 2. This piston rod passes through the cavity 11 and has its inner end supported in a housing 24 provided on the valve casing. There is no packing at the inner end of the cylinder so that the auxiliary air flowing into the cavity 11 may pass about the piston rod into the cylinder.

On the outer end of the piston rod a coiled spring 25 is mounted. This spring is of such length as not to be compressed during the first half of the inward stroke of the piston head but to be compressed during the last half of the stroke. On the outer end of the cylinder 21 an arm 26 is provided and a transverse lever 27 has its end pivoted to said arm. A cap 28 provided on the end of piston rod has pivotal engagement with the lever 27. By swinging the lever 27 the piston head is moved in the cylinder and vice versa by applying pressure against the inner side of the piston and moving the same outward in the cylinder, the lever 27 will be swung.

The lever 27 is so proportioned that when a force of predetermined degree is applied to the lever, substantially the same pressure will be applied to the piston rod 23 at the outer end as will be applied against the inner side of the piston head 22, thus maintaining the piston head in a central position as shown in Fig. 2 and holding the valve 15 on lap. For applying this force or pressure to the piston rod an electro-magnetic device is employed. This device as shown in Figs. 10 and 11 comprises a supporting frame 29 within which and at the opposite ends of which solenoids 30 and 31 are fixed, the solenoid 30 being wound to repel and the solenoid 31 being wound to attract. A sliding core 32 extends through the solenoids and has its end nearest the solenoid 31 pivoted to the end of the lever 27. An electro-magnet 33 is fixed on the core between the solenoids. This magnet is wound in the same direction as the solenoid 30 and will act to attract.

On opposite sides of the frame metal plates 34 are secured and insulated from the frame. One of these plates has connection with the solenoid 30 and the other with the solenoid 31. One of the terminals of the electro-magnet 33 is connected to a contact 35 carried thereon, while the other terminal is connected to a similar contact 36 also mounted on the electro-magnet. These contacts project outward on opposite sides of the frame, one engaging with one metal plate 34 and the other engaging with the other plate. It is apparent that the electro-magnet may be moved between the solenoids without moving the contacts off of the metal plates.

The circuit is shown in Fig. 12 and it is obvious that the current passes from the solenoid 30 through the electro-magnet 33 to the solenoid 31. By this arrangement the movement of the core will be even and regular.

Referring again to Fig. 2 should it be desired to apply the brakes, the piston head of course being at the outer end of its stroke so that the release passage will be open; by a suitable electrical switch (not shown) or other means, current is cut into the solenoids 30 and 31 so that the core 32 is moved to the right. This movement of the core swings the lever 27 inward and causes the piston head 22 to travel inward to end of its stroke which will swing the lever 20 and operate the valve 15 to uncover the passage A as hereinbefore described, which will supply air to the brake cylinder and apply the brakes.

During the last half of the inward movement of the piston the spring 25 is compressed and when the passage A is uncovered air at the same pressure as that delivered to the brake cylinder is delivered to the cavity 11 by the branch passage D. The air delivered to the cavity will flow into the cylinder 21 and against the piston head 22. This pressure and the expansive force of the compressed spring 25 will be opposed to the force exerted by the solenoids. When the desired pressure in the brake cylinder has been attained the same degree of pressure will be applied to the piston head and with the assistance of the compressed spring will be strong enough to overcome the pressure exerted by the solenoids thus forcing said piston head outward to a central position. When the piston head arrives at a substantially central position the assistance of the spring will be lost and the pressures on both sides of the piston head will be substantially equal which will hold the piston in the said position whereby the valve 15 will be held on lap position. It is to be noted that the piston head does not start on its outward stroke until the desired pressure in the brake cylinder is obtained and the passage A will remain uncovered until this pressure is attained; therefore the travel of the brake cylinder piston will not affect the pressure of air in the brake cylinder and the desired pressure will be secured irrespective of said travel.

Should the piston head 22 be moved to throw the valve on lap position and should there be a leak in the brake cylinder, the pressure in the cavity and against the piston 22 will reduce as the pressure in the brake cylinder reduces. This will result in less pressure on the inner side of the piston head than on the outer side therefore the piston head will be forced inward and the passage A again uncovered to supply air to the brake cylinder until the pressure is restored and the piston head again moved to its central position. Should the valve be in lap position and it is desired to increase the braking power, the current in the solenoids is increased sufficiently to overcome the pressure against the inner side of piston head 22 and the latter thus moved inward to again supply air by uncovering the passage A, the current being increased in proportion to the degree of pressure desired.

Now with the valve in lap position and it is desired to release the air in the brake cylinder, current is entirely cut off from the solenoids and the pressure against the inner side of the piston head is free to move said head to the end of its outward stroke whereby the valve 15 will be swung so that the duct 19 connects the passages B and C and permits the air from the brake cylinder to escape as hereinbefore described, the air from the cylinder 21 and cavity 11 passing out through the branch passage D and through the pipe 12 to brake cylinder. However with the valve in lap position and it is desired to retain a portion of the air in the brake cylinder, the current is reduced in proportion to the degree of pressure which is desired to be retained in the brake cylinder. When the current is reduced the pressure against the inner side of the piston head being greater will force the head outward to release position. When the pressure on the inner side of the piston is reduced to slightly less than the pressure on the outer side of the piston head, said head will be moved inward to lap position and the pressure retained in the brake cylinder. When the piston head reaches lap position the lever 27 engages the spring 25 and this prevents further inward movement of the piston head.

It is to be understood some form of device for controlling the current to the solenoids must be provided, but as this is considered a matter of separate invention it has not been shown or described in this application.

By using this invention it is not necessary to reduce the pressure in the train pipe and the pump may be operated solely for the purpose of supplying air at the desired pressure to the auxiliary reservoirs, that is, by not reducing the pressure of air in the train pipe when the brakes are set except only to the extent of the air taken from the auxiliary reservoirs, it is not necessary to restore the pressure as the pump may be continuously operated while the brakes are being applied, held on lap or released.

It is obvious that while this apparatus may be used in connection with the ordinary braking system it could be used otherwise and certain complicated parts of the present system omitted.

I wish to call attention to the fact if it is desired to use the ordinary braking system to which this apparatus is connected and not use said apparatus no interference will be offered for the reason that just as soon as air is admitted to the brake cylinder in the usual manner some of it will flow back through the pipe 12 to the passages A and D and against the inner side of the piston head 22. This will move said head to its outward position whereby the valve 15 will be thrown into release position and the air from the release port of the triple valve may be exhausted through the passage B. The piston will not be moved inward until the solenoids are supplied with current and if it should be it will be returned to release position just as soon as pressure is put into the brake cylinder.

What I claim, is:

1. In an air brake, the combination with an auxiliary reservoir, a triple valve, and a brake cylinder, of a valve casing having a source of air supply from the reservoir and provided with an exhaust opening, a connection between the casing and the release port of the triple valve, an air connection between the brake cylinder and the casing, a valve arranged in the casing arranged to control the passage of air between the auxiliary reservoir and the brake cylinder and also to control communication between the connection from the release port of the triple valve and the exhaust opening of the casing, and a pressure operated device having operative connection with the valve.

2. In an air brake, the combination with a supply reservoir and a brake cylinder, of a valve casing, connections from the casing to the reservoir and the brake cylinder, a valve in the casing interposed between said connections, a pressure cylinder connected to the casing, a piston mounted in the pressure cylinder and having connection with the valve, the casing and pressure cylinder having provision for supplying air at brake cylinder pressure on one side of said piston, and an electrical device arranged to exert pressure on the opposite side of said piston.

3. In an air brake, a valve casing provided with passages, a valve operating across the passages of the casing, a valve stem extending through the casing and connected to the valve, a cylinder connected with the casing, a piston mounted in the cylinder, a connection between the stem and the piston, said piston projecting outside of the cylinder, a lever mounted adjacent the cylinder and connected to the projecting end of the piston, and a spring surrounding the projecting portion of the piston and arranged to permit a movement of the piston without being compressed.

4. In an air brake, a valve casing provided with passages, a valve operating across the passages of the casing, a valve stem extending through the casing and connected to the valve, a cylinder connected with the casing, a piston mounted in the cylinder, a connection between the stem and the piston, said piston projecting outside of the cylinder, a lever mounted adjacent the cylinder and connected to the projecting end of the piston, a spring surrounding the piston and arranged to permit a partial movement of the piston without being compressed, and an electrical operating device connected to the lever.

5. In an air brake, a casing having a body portion and an air chamber at one end and a cavity at the other end, said body having a supply passage and an exhaust passage and an inlet passage leading from the air chamber and extending through the side of the body, said body also having a branch passage leading from the supply passage to the cavity, a valve arranged in the air chamber to cover the passages and having a duct in its underside positioned to connect the exhaust and inlet passages, and a pressure operated device communicating with the cavity of the casing and having connection with the valve.

In testimony whereof I have signed my name to this specification in the presence of two subscribing witnesses.

GUSTAV B. WOLF.

Witnesses:
W. S. CASTLE,
JACK A. SCHLEY.

Copies of this patent may be obtained for five cents each, by addressing the "Commissioner of Patents, Washington, D. C."